No Printed Specification Available
M. Day.
Spinning Mach.
Patented Jun. 2, 1836.
9692X
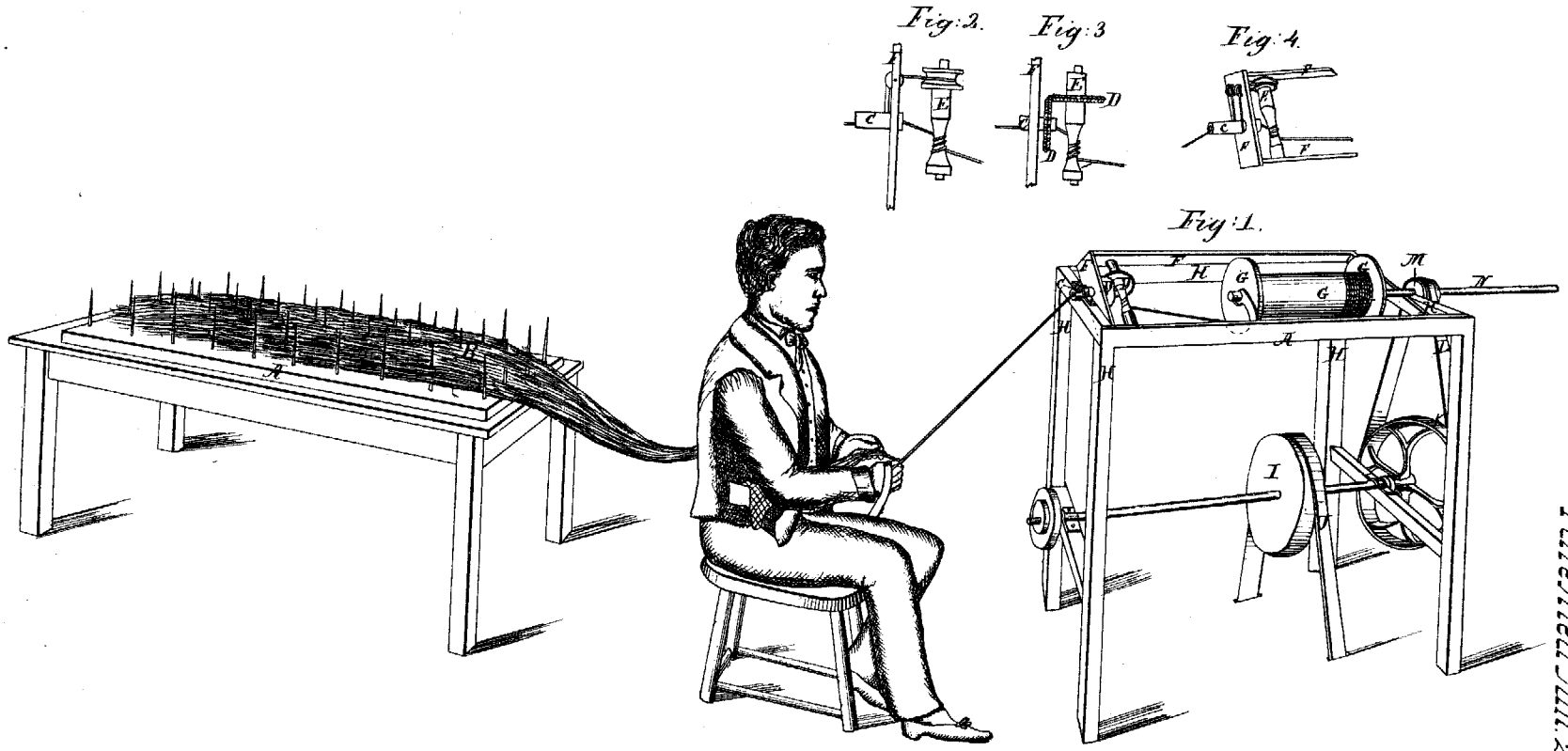
N. PETERS, PHOTO-LITHOGRAPHER, WASHINGTON, D. C.

June [illegible] 1836 9692X 74

Moses Day, of Roxbury, Mass.
Letters Patent
Patented June 2, 1836. —

The schedule referred to in these Letters Patent, and making part of the same, containing a description in the words of the said Moses Day himself of his improvement in the Hemp spinner, for spinning hemp, manella grass and flax.

To all persons whom these presents shall come: Moses Day of Roxbury, in the County of Norfolk, and Commonwealth of Massachusetts. Gentlemen, sends greeting: Be it known that I the said Moses Day have invented, constructed, made and applied to use, a new and useful improvement for spinning hemp. [illegible] flax or manella grass, called a hemp spinner a drawing of which is herewith sent & to which reference is to be had, and the operation of which is as follows. The hemp or flax is laid upon a bench with teeth or pins to keep it straight and hold back what is not wanted for use — the hemp then passes through the right hand of the operator, while the left regulates the quantity required. thence through a tube on which a flyer revolves & on the end of which tube is a stationary gear or cog, the thread then passing round a capstan a sufficient number of times to secure it and draw it from the hand of the operator. The capstan being turned by a gear matching with the fixed gear & propelling the thread forward at every turn — the thread then passing forward over pulley fixed in the side of the flyer, from which it passes on to the bobbin, taking up the slack yarn by means of friction on the mandrel. and operating on the head of the bobbin — The above described improvement in the spinning of hemp & flax, excepting the receiving the yarn upon the bobbin & disengaging it from the same, I claim as new and as my sole invention for the purpose of spinning by hand, yarn from all kinds of hemp, manilla grass or hemp and flax — It is understood that the hemp, grass or flax to be spun in said machine is taken directly from the end without cutting or shortening in any way.

In testimony that the above is a true specification of my said improvement as above described — I have hereunto set my hand this thirty-first day of December in the year of our Lord one thousand eight

[illegible]

9692X

912.

Hundred and thirty-five.
— Witnesses
Abel Cushing
Joseph Harrington

Moses Day (Patented 7 June 1820)

Exd. H.H.

L 500